US008141041B2

(12) United States Patent
Williamson (10) Patent No.: US 8,141,041 B2
(45) Date of Patent: Mar. 20, 2012

(54) AUTOMATED CONFIGURATION UPDATER AND METHOD FOR CODE BUILDER

(75) Inventor: Victor L. Williamson, Woburn, MA (US)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 11/970,263

(22) Filed: Jan. 7, 2008

(65) Prior Publication Data

US 2009/0177684 A1    Jul. 9, 2009

(51) Int. Cl.
*G06F 9/44* (2006.01)
*G06F 9/45* (2006.01)

(52) U.S. Cl. .................... 717/120; 717/108; 717/121

(58) Field of Classification Search .......... 717/120–125, 717/168, 169, 108–109, 116
See application file for complete search history.

(56) References Cited

U.S. PATENT DOCUMENTS

| | | | | | |
|---|---|---|---|---|---|
| 5,680,619 | A   * | 10/1997 | Gudmundson et al. | ....... | 717/108 |
| 6,272,672 | B1 * | 8/2001  | Conway            | ......... | 717/107 |
| 6,684,385 | B1 * | 1/2004  | Bailey et al.     | ......... | 717/109 |
| 7,076,778 | B2 * | 7/2006  | Brodersen et al.  | ......... | 717/170 |
| 7,086,009 | B2 * | 8/2006  | Resnick et al.    | ......... | 715/771 |
| 7,152,224 | B1 * | 12/2006 | Kaler et al.      | ......... | 717/121 |
| 7,260,819 | B2 * | 8/2007  | Spotswood et al.  | ......... | 717/177 |
| 7,383,534 | B1 * | 6/2008  | Agbabian et al.   | ......... | 717/120 |
| 7,386,836 | B2 * | 6/2008  | Fox et al.        | ......... | 717/120 |
| 7,509,244 | B1 * | 3/2009  | Shakeri et al.    | ......... | 703/7   |
| 7,516,439 | B2 * | 4/2009  | Robinson          | ......... | 717/103 |
| 7,523,023 | B1 * | 4/2009  | Koh et al.        | ......... | 703/2   |
| 7,680,935 | B2 * | 3/2010  | Szyperski et al.  | ......... | 709/226 |
| 7,685,563 | B2 * | 3/2010  | Kumar et al.      | ......... | 717/107 |
| 7,757,210 | B1 * | 7/2010  | Krueger           | ......... | 717/120 |
| 7,774,295 | B2 * | 8/2010  | Middelfart et al. | ......... | 1/1     |
| 7,861,158 | B2 * | 12/2010 | Martin et al.     | ......... | 715/243 |
| 7,870,538 | B2 * | 1/2011  | Zenz et al.       | ......... | 717/121 |
| 7,895,566 | B2 * | 2/2011  | Shenfield et al.  | ......... | 717/107 |

OTHER PUBLICATIONS

Bertino, "Index configuration in object oriented database", VLDB Journal, 3, pp. 355-399, 1994.*
Dig et al, "Refactoring aware configuration management for object oriented programs", IEEE ICSE, pp. 1-10, 2007.*
Wang et al, "Object retrieval using configuration of salient regions", ACM CIVR, pp. 67-74, 2008.*
Nguyen et al, "An infrastructure for development of object oriented multi level configuration management services", ACM ICSE, pp. 215-224, 2005.*

* cited by examiner

*Primary Examiner* — Anil Khatri
(74) *Attorney, Agent, or Firm* — Cantor Colburn LLP; Ayla Lari (57) ABSTRACT

A method for automating updates to configuration data includes coding a builder method within a source file for an application component and running the source file through a transformer engine configured to implement an interface within the source file. The builder method is implemented to construct an in-memory data structure representing one or more configuration data elements of a configuration object provided by a configuration service for the application component. The interface provides a mapping between one or more configuration data elements represented in the in-memory data structure and one or more corresponding data elements of a listener object representing changes to the configuration object. The mapping is implemented to update the in-memory data structure at runtime whenever a change to the configuration object is signaled to the listener object.

4 Claims, 7 Drawing Sheets

```xml
<?xml version="1.0" encoding="UTF-8"?>
<listenerService
    xmlns="http://www.ibm.com/WebSphere/AppServer/listenerService"
    xmlns:xsi="http://www.w3.org/2001/XMLSchema-instance"
    xsi:schemaLocation="http://www.ibm.com/WebSphere/AppServer/listenerService
listenerService.xsd">
        <aggregateObject name="community">
            <field name="uid" type="String"/>
            <field name="name" type="String"/>
            <field name="hostname" type="String"/>
            <field name="port" type="int"/>
            <field name="domains" type="list" of="String"/>
            <field name="commProps" type="list"
of="com.ibm.rtc.gateway.dto.interfaces.CustomProperty"/>
            <field name="deleted" type="boolean"/>
            <field name="added" type="boolean"/>
        </aggregateObject>

<ConfigMap name="domainsFromConfig" map="domains"/>

<methodMap class="ConfigService" name="getCommunityDomains(String param)"
map="domainsFromConfig"/>
</listenerService>
```

```java
public class Community extends BaseAggregateObject{ private String uid;
    private String name;
    private String hostname;
    private int port;
    private ArrayList domains;
    private ArrayList commProps;
    private boolean deleted;
    private boolean added;

public String getUid();  //Get the specific instance for this aggregate object

//Methods to check if field is dirty
    public boolean isNameDirty();
    public boolean isHostnameDirty();
    public boolean isPortDirty();
    public boolean isDomainsDirty();
    public boolean isCommPropsDirty();
    public boolean isDeletedDirty();
    public boolean isAddedDirty();
}
```

Figure 4

```
Hashmap map;
public void wellKnownMethod()
{
    List domains = configService().getCommunityDomains("Community uid");
    map = new HashMap();
    map.put("Community uid", domains);
}
```

Figure 6

```
public void domainsProcessPath(String communityUid)
{
    if (communityUid == "Community uid")
    {
      List domains = configService().getCommunityDomains("Community uid");
      map.put("Commuity uid", domains);
    }
}
```

```
List allNodesList

Method StatementBlock buildProcessPath(Node rootNode) {

//First, build the left branches of the tree
    backTrack(rootNode);
    //Second, build the right branches of the tree
    forwardTrack(rootNode);

//Third, build the code and return it.
    return write(rootNode);

Method backTrack(Node node) {

//If the node has already been added to the tree during back tracking, do not
        //repeat the work
        If (node IS inLeftBranchTree){
            return;
        } if (node IS NOT BackwardTrackingEndpoint) {
            //Find all type 1 contact nodes for this node.
            //leftChildNodes is ordered with the last node found put as the first entry
            //The search on allNodesList proceeds left from the node.
            List leftChildNodes = findAllType1ContactNodes(node);

//back track for each left child node found starting from the leftmost.
            for (int i=0; i<leftChildNodes.length; i++) {
                backTrack(leftChildNodes.get(i));
            }

//Find all type 2 contact nodes for this node.
            //rightChildNodes is ordered with the last node found put as the first entry
            //The search on allNodesList proceeds right from the node
            List rightChildNodes = findAllType2ContactNodes(node);

//back track for each right child node found starting from leftmost.
            for (int i=rightChildNodes.length-1; i>=0; i--) {
                backTrack(rightChildNodes.get(i));
            }
```

Figure 9a

```
//Get only those leftChildNodes that have not already been added as left
//children in the tree, and add them as left children to this node.
//The search on allNodesList proceeds left from the node
leftChildNodes = findAllType1ContactNodesNotInLeftBranchTree(node);

node.setLeftChildNodes(leftChildNodes);

//Sets the inLeftBranchTree flag to true on all left child nodes
setInLeftBranchTreeToTrue(leftChildNodes);

} else {
    //Do nothing
    return;
    }
}

Method forwardTrack(Node node) {

//If the node has already been added to the tree during back tracking, do not
    //repeat the work
    If (node IS inRightBranchTree) {
        return;
    } if (node IS NOT ForwardTrackingEndpoint) {
        //Find all type 2 contact nodes for this node.
        //rightChildNodes is ordered with the last node found put as the first entry
        //The search on allNodesList proceeds right from the node.
        List rightChildNodes = findAllType2ContactNodes(node);

//forward track for each right child node found starting from the rightmost.
        for (int i=0; i<rightChildNodes.length; i++) {
            forwardTrack(rightChildNodes.get(i));
        }

//Find all type 1 contact nodes for this node.
        //leftChildNodes is ordered with the last node found put as the first entry
        //The search on allNodesList proceeds left from the node
        List leftChildNodes = findAllType1ContactNodes(node);

//forward track for each left child node found starting from rightmost.
        for (int i=leftChildNodes.length-1; i>=0; i--) {
            forwardTrack(lefttChildNodes.get(i));
        }
```

Figure 9b

```
        //Get only those rightChildNodes that have not already been added as right
        //children in the tree, and add them as right children to this node.
        //The search on allNodesList proceeds right from the node
        rightChildNodes = findAllType2ContactNodesNotInRightBranchTree(node);

node.setRightChildNodes(rightChildNodes);

//Sets the inLeftBranchTree flag to true on all left child nodes
        setInLeftBranchTreeToTrue(leftChildNodes);

} else {
        //Do nothing
        return;
        }
    }

Method StatementBlock write(node) {

//Accumulate left child node statement blocks from left to right
        for (int i=0; i<node.leftChildNodes.length; i++) {
            leftStatementBlock += write(node.leftChildNodes.get(i));
        }

//Accumulate right child node statement blocks from left to right
        for (int i=node.rightChildNodes.length-1; i>=0; i--) {
            rightStatementBlock += write(rightChildNodes.get(i));
        } return leftStatementBlock + node.statement + rightStatementBlock;
    }
}
```

Figure 9c

Figure 10a ◯ Root node

Left branch for type 1 contact

Figure 10b Right branch for type 2 contact

AUTOMATED CONFIGURATION UPDATER AND METHOD FOR CODE BUILDER

BACKGROUND OF THE INVENTION

1. Field of the Invention

Exemplary embodiments of the present invention relate to configuration information for application components, and more particularly, to the updating of configuration data in response to changes in configuration information.

2. Description of Background

With the continuing evolution of network computing, distributed applications utilizing a client/server computing model have become prevalent. An application server is a software engine that can be implemented in a distributed network to deliver applications and resources to connected client computers or devices, typically through the Internet using the HTTP protocol. The term application server applies to all computing platforms including those providing servers for Web-based applications, such as integrated platforms for e-commerce, content management systems, and Web-site builders. An application server handles most, if not all, of the business logic and data access for an application program. A primary benefit provided by application servers is the ease of application development provided by a centralized configuration, as applications need not be programmed; rather, they can be assembled from building blocks provided by the application server, and changes to application configurations, such as a move of a database server, or system settings, can be done centrally.

Nevertheless, applications that execute on a server require reloading and re-initialization when the underlying software code is revised or when the application configuration is revised. In these situations, the server may be in the midst of processing requests on behalf of users for the application to be revised while the application is being reloaded or re-initialized. Thus, it is a challenge to keep the underlying software code or application configuration continuously up-to-date with revisions.

One approach that is used for reconfiguring a server-based application upon an application revision is to stop the server from processing, reload the revised application and reconfigure the server accordingly, and then restart the server in order to implement the changes made to the application and the server. For example, in IBM's WEBSPHERE Application Server platform, for all administrative revisions, the administrator is prompted that the server may need to be restarted for the revisions to take effect. WEBSPHERE provides a configuration listener that developers can implement within software components to listen for configuration changes. Most of the components, however, do not use the listener properly or do not use it at all, leaving stale data in the code.

This approach has numerous shortcomings, one of which is the fact that the server cannot process requests for the revised application, or any other application installed on the server, while it is off-line or in the process of restarting. Requests that are in progress when the server is restarted may be interrupted, which typically leads to request processing errors. Furthermore, any server down-time adversely affects the availability of the server, which in turn may have an impact on, for example, SLAs (Service Level Agreements) associated with the services provided by the server.

Another shortcoming of this approach is that because large servers typically have multiple applications executing, an application maintenance operation requiring server stop/restart each time an application is changed may not be a practical approach for a high-traffic server, partly due to the time it takes to restart a server running multiple applications. Again, while the server is off-line and while being restarted, users may be denied access to the server. A complex server can take on the order of minutes to restart, and a tremendous amount of request traffic can be lost in that time. Furthermore, if an error is discovered in the new application configuration subsequent to the reload, another server stop/restart will be required. Yet another shortcoming to note is that interrupting requests that are in progress by restarting the server may have the effect of compromising the integrity of the data associated with the current user sessions, which can lead to errors when the server resumes its request processing.

Accordingly, it is desirable to provide a listener mechanism that does not need to be implemented by application developers so that developers are able to focus on designing components, fixing bugs, etc.

SUMMARY OF THE INVENTION

The shortcomings of the prior art can be overcome and additional advantages can be provided through exemplary embodiments of the present invention that are related to a method for automating updates to configuration data. The method comprises coding a builder method within a source file for an application component and running the source file through a transformer engine configured to implement an interface within the source file. The builder method is implemented to construct an in-memory data structure representing one or more configuration data elements of a configuration object provided by a configuration service for the application component. The interface provides a mapping between one or more configuration data elements represented in the in-memory data structure and one or more corresponding data elements of a listener object representing changes to the configuration object. The mapping is implemented to update the in-memory data structure at runtime whenever a change to the configuration object is signaled to the listener object.

The shortcomings of the prior art can also be overcome and additional advantages can also be provided through exemplary embodiments of the present invention that are related to computer program products and data processing systems corresponding to the above-summarized method are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented to automate the configuration listener update process for application or software components to support changes in configuration data. Exemplary embodiments can thereby facilitate software development by allowing developers and programmers to focus on meeting software requirements for specific problems rather than dealing with more tedious low level details of providing the listener services themselves and incrementally implementing changes to configuration data within the component.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

FIG. 4 is an exemplary embodiment of an XML implementation of a listener service for a configuration context and a skeletal class for a listener object.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention can be implemented to automate the configuration listener update process for developers of application or software components to support changes in configuration data. Exemplary embodiments can thereby facilitate software development by allowing developers and programmers to focus on meeting software requirements for specific problems rather than dealing with more tedious low level details of providing the listener services themselves and incrementally implementing changes to configuration data within the component. Rather, code for the listener and updating configuration data will be built for them using a software engine. Exemplary embodiments can therefore be implemented to enable applications to remain up to date with configuration data while requiring few, if any, restarts upon administrative configuration changes. This can enable internal or in-memory data structure representations of configuration data to be updated at any time without requiring the developer to re-implement listener code.

Generally, a software component can be defined as a program building block that may be reusable and may be combined with other components in the same application or other computers in a distributed network to form an application. Examples of components include, but are not limited to, GUI buttons and database management interfaces. Components may be deployed on different servers in a network and may communicate with each other for needed services. A component may run within a context called a container, which is a class, a data structure, or an abstract data type (ADT), the instances of which are collections of other objects. Examples of containers include, but are not limited to, pages on a Web site, Web browsers, and word processors.

Figure 1:
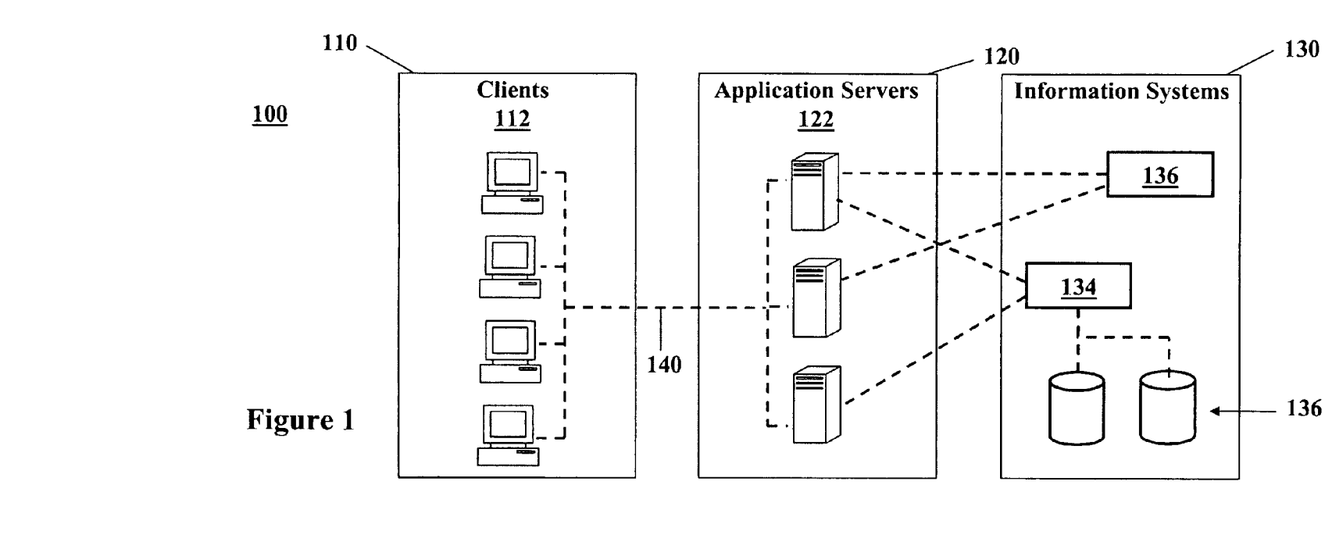
FIG. 1 is a block diagram illustrating an exemplary embodiment of a client/server application programming architecture.

Referring now to FIG. 1, an exemplary embodiment of a client/server application programming architecture 100 is illustrated within which exemplary embodiments of the present invention may be implemented. Architecture 100 provides a three-tier architecture for the application logic layer, enabling client components to interact with data resources and legacy applications. An example of platform that utilizes application programming architecture 100 is IBM's WEBSPHERE Application Server. Architecture 100 enables the distribution of application functionality across three independent systems: (1) client components 112 running on local workstations in a presentation tier 110 and typically providing a Web-browser based graphical user interface (GUI) such as the NETSCAPE NAVIGATOR or MICROSOFT INTERNET EXPLORER web browsers (it is noted that the web browser need not be a web browser per se, but may be any of various, types of client-side applications that include web-browsing functionality); (2) processes running on a cluster of remote application servers 122 in a business logic tier 120, possibly on a local area network or Internet server; and (3) a discrete collection of legacy application databases 132, resource manager applications 134, and mainframe applications 136 in a back-end data/resource tier 130, possibly on a mainframe or a large server.

All three tiers communicate with each other, and this communication can be simplified through the use of open, standard protocols and exposed application programming interfaces (APIs). Client components 112 can be written in any programming language, such as Java or C++, and these clients can be run on any operating system through communication with the processes running in business logic tier 120. Business logic tier 120 is the middleman between browser-based front-ends and back-end databases and legacy systems. Databases 132 in the third tier can be of any suitable design that allows the processes running in business logic tier 120 to query and manipulate them. Data/resource tier 130 may, for example, be responsible for managing enterprise data or performing business functions for an enterprise.

In the present exemplary embodiment, responsibility for presentation and user interaction resides with client components 112 in presentation tier 110. Client components 112 enable the user to interact with the processes running in business logic tier 120 in a secure and intuitive manner. Exemplary embodiments can support several client types. For example, client components 112 may be run in desktop computers or workstations running any of various operating systems, such as Windows, Mac OS, Unix, etc., as well as portable computing devices, such as a personal data assistant, smart cellular phone, etc. Client components may use a network connection for communicating with processes running in business logic tier 120 via a network 140, such as the Internet or an Intranet. Although web applications are often associated with particular communication protocols, such as HTTP or SSL, it is noted that any communication protocol, including TCP-based protocols and UDP-based protocols, may be used to communicate over network 140. Client components 112 do not access data/resource tier 130 directly.

The processes running on remote application servers 122 in business logic tier 120 are commonly referred to as the application logic layer. These processes manage the business logic of the application, and are permitted access to the services provided in data/resource tier 130. The application logic layer is where most of the processing work occurs. Multiple client components presentation tier 110 can access the processes running in business logic tier 120 simultaneously, so this application logic layer is implemented to manage its own transactions. It should be noted that application server clusters may be implemented and utilized in any of various types of systems, and FIG. 1 illustrates only one exemplary use. Although FIG. 1 illustrates business logic tier 120 having three application servers 122, it is noted that the business logic tier may comprise any number of application servers. Each application server may interface with various types of other servers or systems. For example, as illustrated in FIG. 1, application servers 122 may communicate with databases 132. Each application server in the cluster may interface with the same systems, or application servers 122 may differ in the systems with which they interface.

In exemplary embodiments, application servers 122 in business logic tier 120 may or may not be in close physical proximity to each other. The application server computers may be connected to each other in any of various ways. In one exemplary embodiment, each application server computer may be a member of a single local area network (LAN). In another exemplary embodiment, the application server computers may be distributed between two or more LANs, wherein the LANs are networked together.

In exemplary embodiments, application servers 122 can be Java virtual machine (JVMs) running user applications. Application servers 122 can be implemented, for example, to use Java technology to extend Web server capabilities to handle Web application requests. A Web application can comprise a collection of resources that may include web pages comprising HTML, XML, scripting code such as Javascript or VBScript, or other types of elements. The resources may also include any of various types of executable programs or components, such as CGI programs, Java servlets, JavaBeans components, CORBA components, downloadable code such as Java classes or ActiveX components, etc. The resources may also include any other type of resource addressable through a URL. Application servers 122 can comprise application code, including servlets, JavaServer Pages (JSP) files, enterprise beans and their supporting classes, and be implemented to make it possible to generate a dynamic, customized response to a client request.

In exemplary embodiments, application servers 122 can be implemented such that administrated tasks that are responsible for the operational environment (that is, the process settings) in which the resources (that is, executable programs or components) run are performed using administrative clients such as, for example, administrative consoles, scripting clients, administrative programs (for example, a Java programming interface through which application configuration can be queried or modified), and command line tools. Administrative tasks typically involve defining new configurations or performing operations on managed resources within the environment. These administrative clients can be used to manipulate meta-information (for example, XML configuration files, schema, DTD files, etc.) that may describe elements or properties of configuration data and relationships (for example, hierarchical relationships) among the elements of the configuration data, by editing these meta-information files. During development, configuration data, and thus the meta-information describing the configuration data, may be changed. In exemplary embodiments, the configuration data for application servers 122 can be maintained by an administration server. The administration server can, for instance, be implemented within back-end data/resource tier 130.

Figure 2:
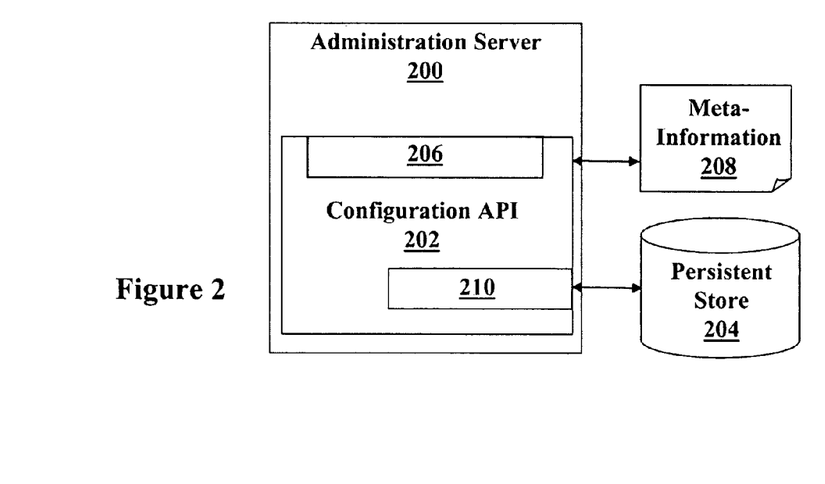
FIG. 2 is a block diagram illustrating an exemplary embodiment of an administration server.

Referring now to FIG. 2, an exemplary embodiment of an administration server is illustrated. FIG. 2 includes administration server 200 and meta-information 208 describing a persistent store 204 of configuration information maintained by the administration server. Meta-information 208 may be configuration information in any of different formats including, but not limited to, XML, LDAP, DTD, schema, database-based, and file-based. A configuration API 202 is implemented within administration server 200 that may be used as a basis for administering a server system. Configuration API 202 includes a configuration context 206 and represents the configuration information of persistent store 204 in memory of administration server 200.

In exemplary embodiments, all elements or properties of the persistent store 204 may be represented in one or more meta-information 208 files (for example, XML files), which may include rules defining the system configuration data including instances of configuration information for associated application components. In exemplary embodiments, there may be one such file per instance in the server system. Meta-information 208 may describe configuration data elements to be administered and their attributes. This configuration information may include server-level configuration information such as information describing data of persistent store 204 and information describing deployed applications that application servers associated with administration server 200 may run. For example, an element called "server" may have attributes such as name, locale(s), log-root, etc. These attributes may have default values described in meta-information 208, as well as a list of correct possible values, and certain attributes may be described as REQUIRED or IMPLIED.

In exemplary embodiments, configuration API 202 may provide an interface to manage (for example, create, read, validate, write, and/or delete) the system configuration information of persistent store 204 as represented by meta-information 208, and may abstract the persistent store for client components of administration server 200 to provide flexibility of storage and location transparency. Configuration API 202 can be used as a generic, transparent access method to the backend storage of persistent store 204 as represented in meta-information 208, independent of the format of the backend storage. In exemplary embodiments, persistent store 204 of configuration information may be distributed across one or more data storage devices, and may be formatted in accordance with one of a variety of heterogeneous data storage formats (for example, the persistent store may be an XML file, an object database, a relational database, or any other type of file-based or database repository). The data storage format and/or distribution of persistent store 204 may be changed, for example to meet changing requirements of the system. A query mechanism may be provided that uses a query language (for example, XML Path Language (XPath)) to access persistent store 204 and to hide the persistent store implementation.

In exemplary embodiments, configuration API 202 functionality may include, but is not limited to, one or more of, basic configuration operations (for example, set and get elements and attributes APIs), event notification, and a change management mechanism. Client components of configuration API 202 may do a lookup using the configuration API to construct an in-memory representation of the corresponding configuration data from persistent store 204. Configuration API 202 may provide support for distributed systems and may provide hierarchical semantics into the configuration data.

In exemplary embodiment, configuration context 206 may provide an interface that includes APIs to read, persist, and access persistent store 204 data. Configuration context 206 may provide central in-memory abstraction of the configuration data. Configuration API 202 also includes storage adapters 210 of that may be used (and switched) below the configuration to interface to the particular persistent store 204 format. Configuration context 206 may be used, for example by a listener service or container, to look up configuration data as desired. In exemplary embodiments, configuration context 206 may be used to write to multiple storages on different machines with a single operation. In exemplary embodiments, a configuration context 206 may be created for each associated server during server initialization.

Configuration context 206 can include an event notification mechanism that tracks changes to configuration data and allows clients to register a listener service if the clients desire to hear about changes to configuration objects. A configuration object refers to a configuration document that defines configuration instances of runtime client components. For each registered listener service, configuration context 206 tracks changes done to configuration objects implemented by the registered client. Each change may be obtained/reset anytime from configuration context 206 and can be used to trigger a notification event. Configuration context 206 may propagate notifications about configuration changes (for example, add, update, delete, set, etc.) to all registered listener services as listener objects. The listener objects, built upon configuration API 202, may be abstracted from the details of persistent store 204 of the configuration data, as well as from the tracking of changes. Using this event notification mechanism, the listening clients may not need to access persistent store 204 for configurations updates. Instead, each client receives event notifications of changes and can update the appropriate elements and/or attributes of its instances of configuration objects in memory as indicated in the listener objects provided by the notifications. In exemplary embodiments, a query language (for example, XPath) may be used to determine the locations of changes in configuration context 206. In exemplary embodiments, notifications may be sent over a RMI (Remote Method Invocation) channel using a wire protocol (for example, JRMP wire protocol). In exemplary embodiments, the changes cached in configuration context 206 may be categorized into one or more notifications. Thus, there may be a many-to-many relationship between configuration context cached changes and notifications.

Figure 3:
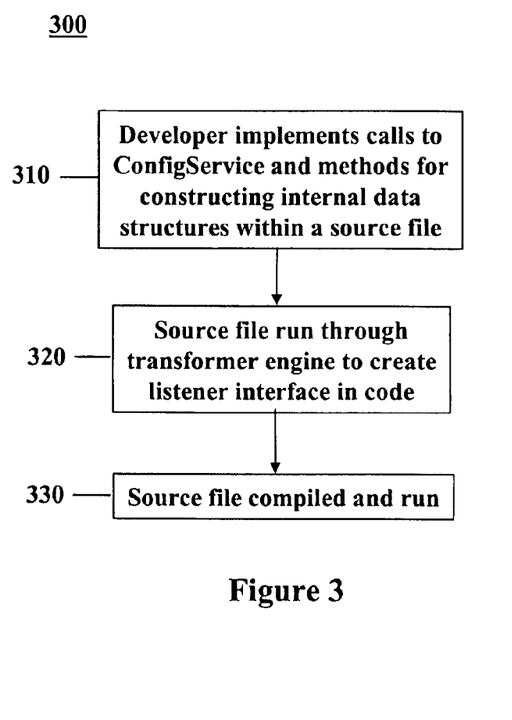
FIG. 3 is a flow diagram illustrating an exemplary embodiment of a process for automating the updating of an instance of a configuration data for an application component in accordance with the present invention.

In accordance with an exemplary embodiment of the present invention, FIG. 3 illustrates a flow diagram of a process 300 for automating the updating of an instance of a configuration data for an administration client component in response to a change in the configuration data. In exemplary process 300, at block 310, the developer of the client component implements code within a source file for reading and returning one or more configuration data elements from the configuration files (provided by performing, for example, a lookup of the a back-end persistent store through a configuration API). This data may be, for example, provided in the form of a Java Properties file, an XML file, or other file-type representing configuration information.

In the present exemplary embodiment, an implementation of the configuration API termed ConfigService is provided support requests to read the configuration data elements from an object in the configuration context by the client component. ConfigService provides a programming interface through which the configuration context for a client component domain can be queried or modified. A call to ConfigService may be implemented to obtain all of the configuration data elements from a configuration object of the configuration context or to obtain only a subset (or simply one) of the configuration data elements from a configuration object. In exemplary embodiments, the ConfigService implementation may return entire configuration objects queried from the configuration context for a client component domain from which the desired configuration data elements can be obtained or ConfigService may return only the desired data elements. In exemplary embodiments, different calls to ConfigService at block 310 may obtain data configuration elements from the same configuration object.

At block 310 of exemplary process 300, the developer also implements code within the source file for constructing corresponding internal data structure representations of the configuration data elements. This code uses the configuration data elements returned by the calls to ConfigService to construct the internal data structure representations, and can comprise any of a number of suitable methods for constructing data structures. Such methods are well known and can provide all the necessary logic for mapping configuration data elements to the internal data structures, and also may implement constraints on the data elements as defined in meta-information. For example, an internal data structure can be constructed in a hierarchical relationship to represent a hierarchical relationship of the configuration data elements. In the present exemplary embodiment, the source file is implemented to reside within a ConfigUpdater class that includes "get" methods for the configuration data elements in the configuration API.

In the present exemplary embodiment, at block 320, the ConfigUpdater file containing the internal data structures created by the developer at block 310 (for example, a file written in the Java programming language called ConfigUpdater.java) is run through a transformer engine to create an interface that maps the data elements of the internal data structures to corresponding data elements of listener objects so that the internal data structures can be updated at runtime in responses to changes in configuration data. The transformer engine is implemented to perform a method that receives the ConfigUpdater source file as input and outputs a modified or transformed ConfigUpdater source file that contains code for updating an internal data structure at runtime whenever a change is made to the corresponding configuration data elements. In creating the interface, the transformer engine utilizes an existing listener service for the configuration context for the client component that specifies mappings from the data elements of the configuration objects that are read using ConfigService at block 310 to corresponding method names that obtain those data elements. Each listener object thus represents a configuration object in which configuration data has been changed. There is a one-to-one mapping relationship between number of different configuration objects that are read by the ConfigService calls implemented at block 310 and the number of listener objects specified by the mapping provided at block 320.

FIG. 4 illustrates an exemplary embodiment of an implementation of a listener service for a configuration context and a skeletal class for a listener object. The example comes from the community object for the IBM Lotus Sametime Gateway, and the listener object is provided as an XML object. In the example of FIG. 4, the ConfigService class used by the listener service is an implementation of the configuration API.

In particular, at block 320, the method performed by the transformer engine creates a process path method for each call to ConfigService implemented at block 310 that maps the corresponding data elements of the internal data structure to the configuration API. The method operates by examining the code implemented at blocks 310 to determine the dynamic flow of objects from the configuration data elements to the internal data structures, and the dynamic flow is then implemented within process path methods. Each process path method contains code for updating an internal data structure at runtime whenever the listener object corresponding to that internal data structure is fired by the listener service upon receiving notification of a change to the corresponding configuration data elements.

Figure 5:
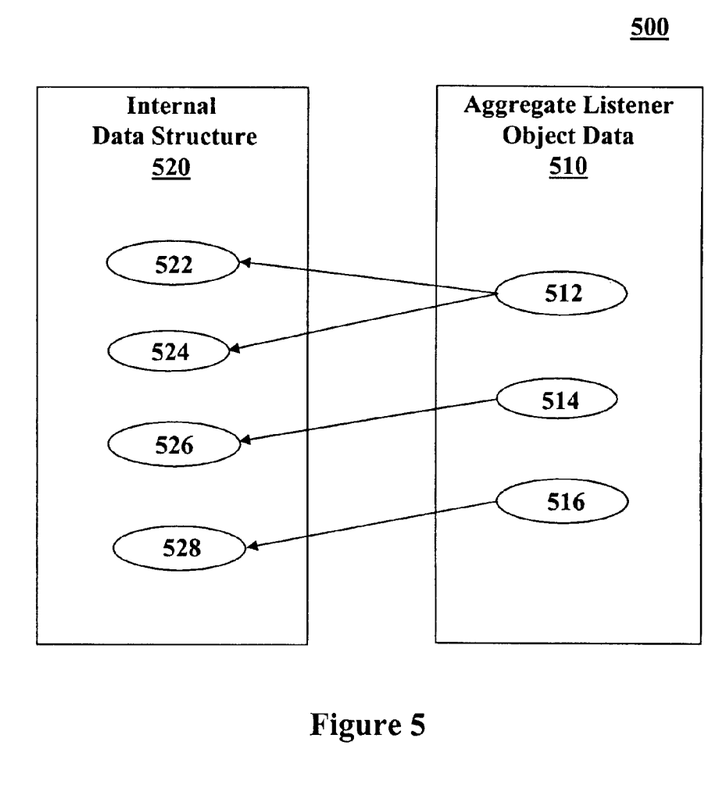
FIG. 5 is a block diagram illustrating an example process path mapping created using the exemplary process of FIG. 3.

FIG. 5 illustrates an example process path flow 500 that can be created at block 320 in exemplary process 300. In this example, data elements representing changed configuration data are mapped from instances of listener objects 512, 514, and 516 of an aggregate listener object 510 to instances of internal data structures 522, 524, 526, and 528 that have been constructed in memory in the ConfigUpdater file for an internal data structure 520. In exemplary embodiments, more than one internal data structure may be mapped to the same listener object (for example, internal data structures 522 and 524 are both mapped to listener object 522 in FIG. 5). This is because the developer may code the source file to store the same data in two different locations. Thus, a many-to-one mapping relationship between internal data structures and listener objects may be created at block 330.

After the process path flow is created at block 320 in exemplary process 300, the ConfigUpdater source file can be compiled and run at block 330. During system development, configuration data, as well as the meta-information describing the configuration data, may be changed. By creating the ConfigUpdater file and running it through the transformer engine to create the listener interface, the ConfigUpdater file is thereby configured to provide an automatic way to update the internal data structures representing configuration data when the configuration data is changed. Thus, it is not necessary for the developer to manually locate every instance of the corresponding data elements or attributes in the internal data structures and make changes to the internal data structures to support changes in configuration data elements or attributes whenever such a change occurs.

Figure 6:
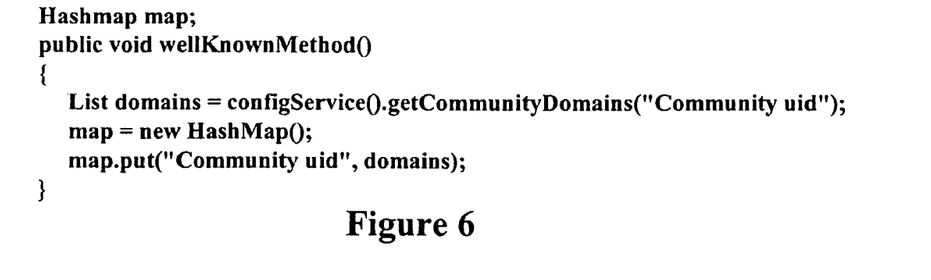
FIG. 6 is an exemplary block of pseudo-code implemented to construct an in-memory data structure.
Figure 7:
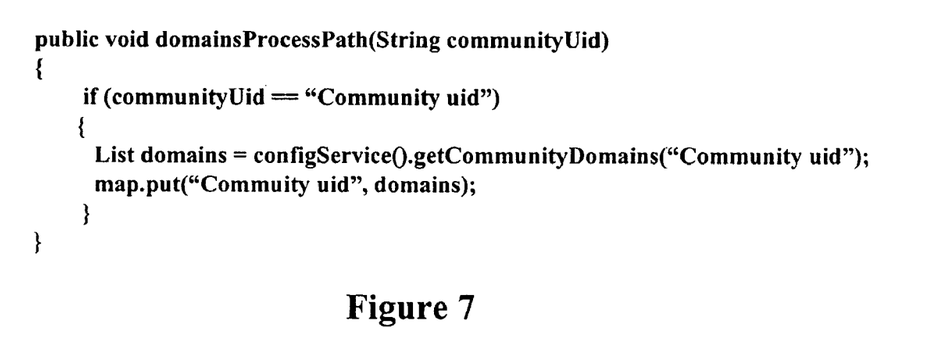
FIG. 7 is an exemplary block of pseudo-code providing a process path mapping for the example pseudo-code of FIG. 6 and created using the exemplary process of FIG. 3.
Figure 8:
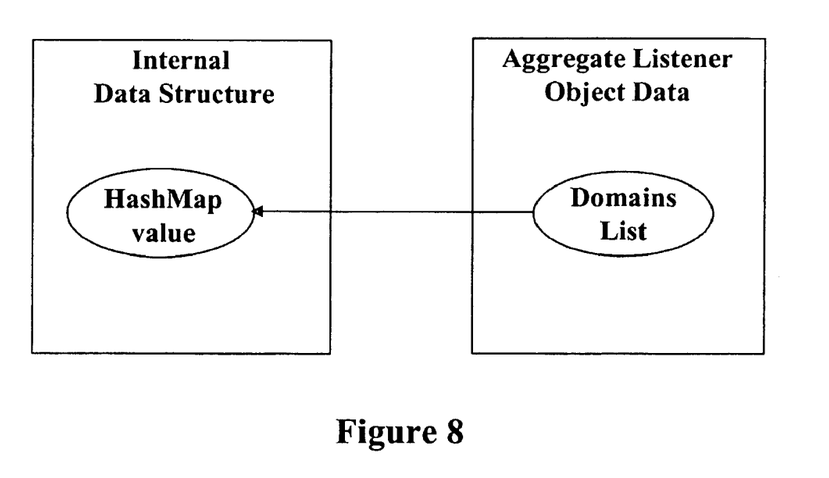
FIG. 8 is a block diagram illustrating the exemplary process path mapping of FIG. 7.

To further illustrate exemplary process 300, an example is now provided in which consider a HashMap internal data structure is implemented to represent configuration data mapping a Community UID to a list of domains associated with that Community UID. To construct the HashMap, a developer could implement the pseudo-code illustrated in FIG. 6. Upon running the code through the transformer engine and compiling, as described at blocks 320 and 330 in exemplary process 300, the ConfigUpdater will be implemented to use a process path for domains to update the HashMap with the new list whenever the domains change during runtime. As illustrated by the pseudo-code in FIG. 7, the process path method created in this example mimics the wellKnownMethod method implemented by the developer and shown in FIG. 6. That is, the process path queries the configuration API for the domains and adds the return value into the HashMap using Community UID as the key, as shown in FIG. 8.

As shown by this example, the code for the listener object mapping method implemented by the transformer engine in a ConfigUpdater file is derived from the existing code for constructing the internal data structure. To illustrate, this mapping relationship can be characterized by a tree data structure having a set of linked nodes in which the nodes represent code statements and the branches represent points of contact with other nodes. The root node of the tree represents the code statement where the configuration data elements are read directly from the configuration API using ConfigService. In the HashMap example provided above, this would be the code statement 'List domains=configService( ).getCommunity-Domains("Community uid")' in which the list of domains is obtained.

Figure 9A:
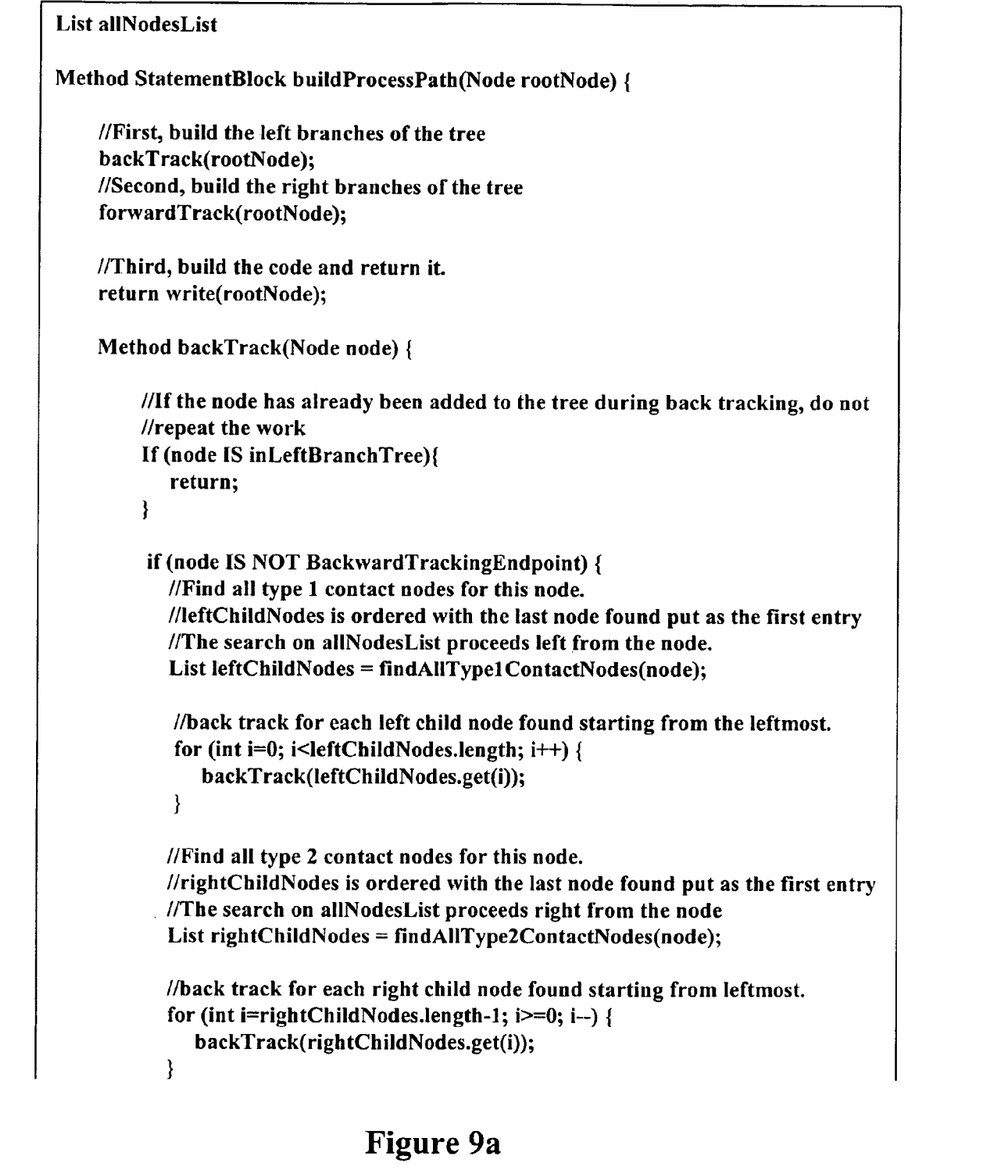
FIGS. 9a-9c illustrate pseudo-code for an exemplary embodiment of a method performed by a transformer engine in the exemplary process of FIG. 3.
Figure 9B:
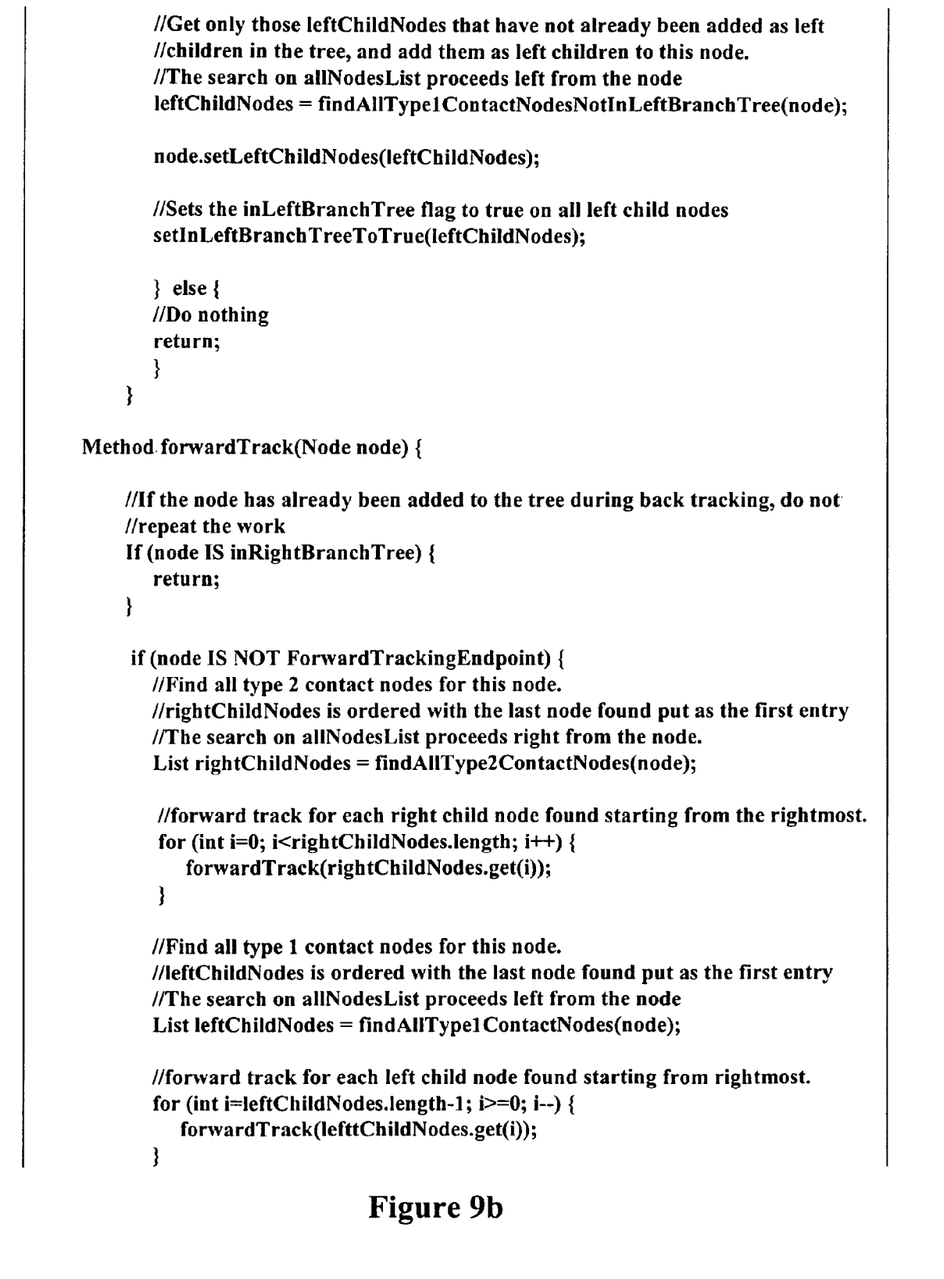
Figure 9C:
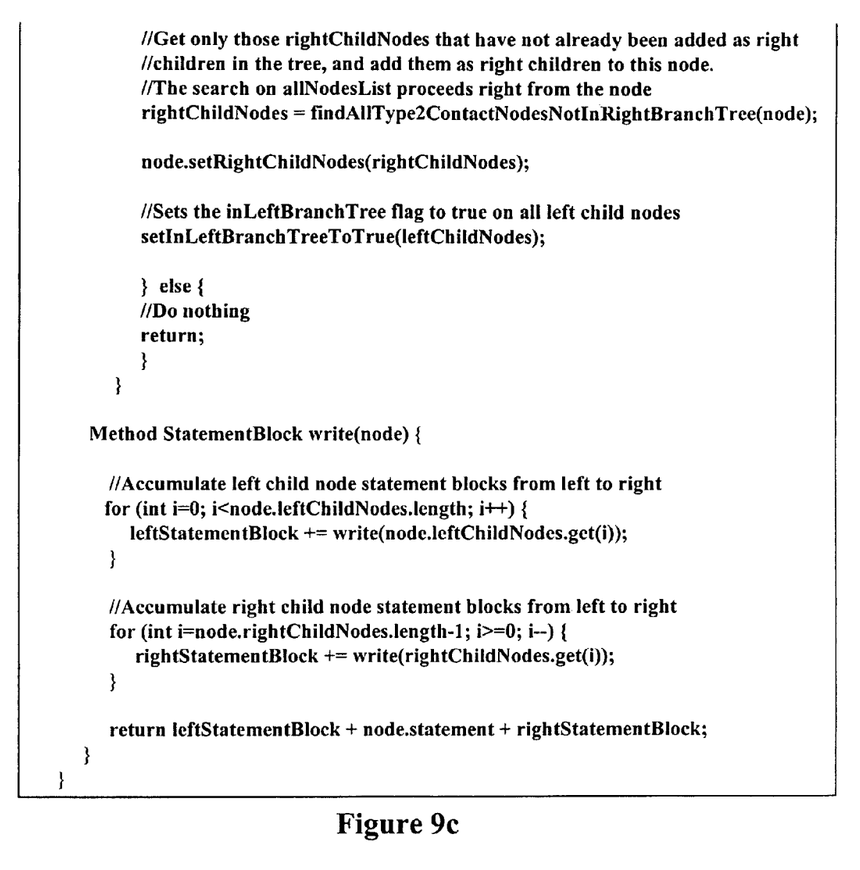

To further illustrate, an exemplary embodiment of the method performed by the transformer engine to provide for listener object mapping is provided as pseudo-code in FIGS. 9a-9c. The exemplary transformer method of FIGS. 9a-9c can be viewed as a flow of objects within the tree having endpoints where the flow stops, and will now be described using the following terms as defined below:

Statement=A code statement.

Statement block=One or more statements.

Contact=Message flow via objects that connects two statements. These two statements are said to be in contact.

Forward tracking=Act of processing statements that appear later in the code.

Backward tracking=Act of processing statements that appear earlier in the code.

Type 1 contact=Represents a contact due to input parameters that are variables assigned in a previous assignment statement. Used for backward tracking.

Type 2 contact=Represents a contact due to passing the assigned variable in an assignment statement as a parameter input to a method in a later statement. Used for forward tracking.

Write=writes a statement to the listener code.

Forward tracking endpoint=A statement (that is, a node) that is not an assignment statement, that is, does not set a variable that could be used later, or an assignment statement whose variable is never used.

Back tracking endpoint=An assignment statement (that is, a node) that assigns a literal or a member field to the variable, or an assignment statement with method calls whose parameter inputs are exclusively literals and/or member variables.

Tree=A tree of nodes.

Node=A statement.

Leaf node=A forward tracking or a back tracking endpoint node.

Left child node=A node with type 1 contact with parent node.

Right child node=A node with type 2 contact with parent node.

inLeftBranchTree node attribute=Specifies whether a node was added as a left child in the tree during back tracking.

inRightBrachTree node attribute=Specifies whether a node is added as a right child in the tree during forward tracking.

UID=Unique identifier for an aggregate object.

For a given method, there could be backward flow representing objects passed into the method and forward flow representing variables that are set and used later. The method tracks both forward and backward object flow from this root node, until all endpoints are reached. This flow path includes all the logic required to update the internal data structures upon a change to a given configuration object. The code for constructing the internal data structures is essentially repeated in the listener object mapping code to implement the logic that needs to be implemented to map a given configuration object to an internal data structure in a process path method that performs this logic when that object changes in the configuration.

The inLeftBranchTree and inRightBranchTree attributes specify if a given node was added to the tree during back tracking and forward tracking respectively. When the tree is built, a node is only added as left child node the first time it appears when building from the left side, and not on subsequent appearances. Likewise, a node is only added as right child node the first time it appears when building the tree from the right side. Otherwise, duplicate sub-trees could result throughout the tree where multiple parent nodes point to identical child nodes.

The UID is the means by which configuration objects are identified in the code. Therefore, the UIDs are hard coded within the code for accessing configuration objects. Upon change in configuration data, the configuration API notifies the aggregate listener object by passing the UID of the configuration object that was changed to the corresponding listener object, so that it can be used by the internal data structure to access the appropriate object from the configuration API. In alternative exemplary embodiments, the process path methods can be created by the transformer to provide mappings that facilitate internal data structures in getting configuration data elements of changed configuration objects directly from the listener objects.

Figure 10A:
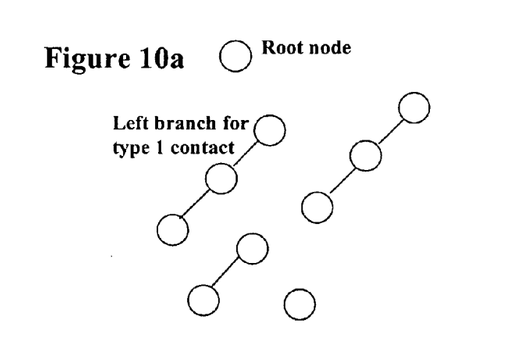
FIGS. 10a-10b are block diagrams illustrating an exemplary process path mapping being implemented using the exemplary method of FIGS. 9a-9c.
Figure 10B:
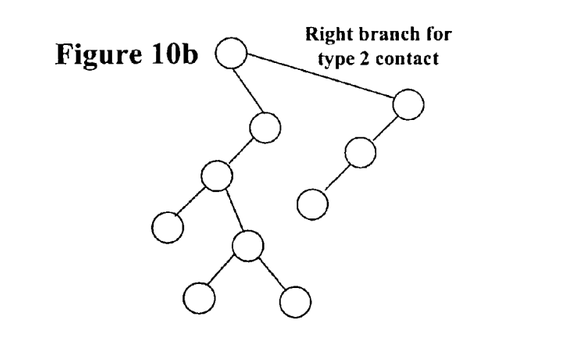

In the present exemplary embodiment, the transformer method is implemented under the assumption that a list of node objects, termed allNodesList in FIGS. 9a-9c, is provided in the order in which they appear in the code. For simplicity, the present exemplary embodiment also assumes that there is no variable reuse, that is, each variable appears in no more than one assignment statement. The transformer method is recursive, operating to first build the left branches, then build the right branches, and then traverse the tree to implement the statements for the listener code. The inLeftBranchTree node attribute ensures multi-contacted left nodes appear farthest left in the tree, and the inRightBranchTree node attribute ensures multi-contacted right nodes appear farthest right in the tree. The left branches are added from the bottom up and left to right. The right branches are then added from the bottom up and right to left. To illustrate, when the back tracking completes you will have a disjoint tree with only left branches as shown in the example in FIG. 10a. After the forward tracking completes, the tree has the right branches added, as shown in the example in FIG. 10b.

In the HashMap example described above, after the transformer method is performed, the resulting tree will have two nodes that correspond to the two code statements in the domainsProcessPath method, with a type 2 contact between the 'List domains=configService( ).getCommunityDomains ("Community uid")' assignment statement and the 'map.put ("Community uid", domains)' method call statement that represents a type 2 contact that results from passing the assigned domains variable from the first statement as a parameter input to the method of the second statement.

Exemplary embodiments of the present invention can take the form of an entirely hardware embodiment, an entirely software embodiment, or an embodiment including both hardware and software elements. In exemplary embodiments implemented in software, the software can include, but is not limited to, firmware, resident software, microcode, etc.

Furthermore, exemplary embodiments can take the form of a computer program product accessible from a computer-usable or computer readable medium providing program code for use by or in connection with a computer or any instruction execution system. In exemplary embodiments, a computer-usable or computer-readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Examples of optical disks include read only memory compact disk (CD-ROM), read/write compact disk (CD-R/W) and DVD.

In exemplary embodiments, a data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

In exemplary embodiments, network adapters may also be coupled to the system to enable the data processing system to become coupled to other data processing systems or remote printers or storage devices through intervening private or public networks. Modems, cable modems, and Ethernet cards are just a few of the currently exemplary types of network adapters.

Although exemplary embodiments of the present invention have been described in detail, it should be understood that various changes, substitutions and alternations can be made therein without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A computer-implemented method for automating updates of an instance of configuration data for an administration client component in response to a change in the configuration data, the method comprising:

coding, at a computer system, a builder method within a source file for the administration client component, the builder method being implemented to construct an in-memory data structure representing one or more configuration data elements of a configuration object provided by a configuration service for the administration client component;

implementing an interface within the source file by processing the source file through a transformer engine of the computer system, the interface providing a mapping between the one or more configuration data elements represented in the in-memory data structure and one or more corresponding data elements of a listener object representing changes to the configuration object, the mapping being implemented to update the in-memory data structure at runtime whenever a change to the configuration object is signaled to the listener object, wherein implementing the interface comprises, creating a process path method for each representation of the one or more configuration data elements, wherein each process path method is configured to examine the builder method to determine a dynamic flow of objects from the one or more configuration data elements to the internal data structures, wherein each process path method contains code for updating an internal data structure at runtime whenever the change to the configuration object is signaled to the listener object, and; the builder method is implemented to construct the in-memory data structure as hierarchical structure representing a hierarchical relationship between the one or more data elements of the configuration object;

implementing the dynamic flow across each process path method;

compiling the source file in response to the implementing to create a compiled file; and executing the compiled file.

2. The method of claim 1, wherein the transformer engine implements a listener to receive notifications from the configuration service that comprise an identifier for the configuration object that indicates changes to the configuration object, wherein the transformer engine implements the listener object to pass the identifier to the in-memory data structure, wherein the transformer engine implements the mapping to return the one or more configuration data elements of the configuration object from the configuration service using the identifier, and wherein the transformer engine implements the mapping to update the in-memory data structure in accordance with changes to the one or more configuration data elements.

3. The method of claim 2, wherein the transformer engine implements the interface using an existing listener service for the configuration object.

4. The method of claim 1, wherein the configuration object is provided by the configuration service, and further comprising coding the source file to identify the one or more data elements from the configuration object for the builder method.

* * * * *